(12) United States Patent
Howell et al.

(10) Patent No.: US 10,794,038 B2
(45) Date of Patent: Oct. 6, 2020

(54) IMPLEMENT ANGLE DETERMINATION USING A LASER DISTANCE METER

(71) Applicant: Caterpillar Trimble Control Technologies LLC, Dayton, OH (US)

(72) Inventors: Mark Nicholas Howell, Christchurch (NZ); Samuel Joseph Frei, Christchurch (NZ)

(73) Assignee: Caterpillar Trimble Control Technologies LLC, Dayton, OH (US)

( * ) Notice: Subject to any disclaimer, the term of this patent is extended or adjusted under 35 U.S.C. 154(b) by 0 days.

(21) Appl. No.: 16/435,916

(22) Filed: Jun. 10, 2019

(65) Prior Publication Data

US 2019/0292748 A1 Sep. 26, 2019

Related U.S. Application Data

(63) Continuation of application No. 15/386,115, filed on Dec. 21, 2016, now Pat. No. 10,358,788.

(51) Int. Cl.
| | |
|---|---|
| *E02F 3/43* | (2006.01) |
| *G01S 17/88* | (2006.01) |
| *E02F 9/26* | (2006.01) |
| *G01S 17/08* | (2006.01) |
| *G05D 1/02* | (2020.01) |
| *E02F 3/32* | (2006.01) |

(52) U.S. Cl.
CPC .............. *E02F 3/435* (2013.01); *E02F 9/264* (2013.01); *E02F 9/265* (2013.01); *G01S 17/08* (2013.01); *G01S 17/88* (2013.01); *G05D 1/024* (2013.01); *E02F 3/32* (2013.01); *G05D 2201/0202* (2013.01)

(58) Field of Classification Search
CPC ...... E02F 3/00; E02F 3/40; E02F 3/43; G01C 3/10; G01C 3/22; G01C 3/24; G01C 3/26; G01S 17/00; G01S 17/08; G01S 17/46
See application file for complete search history.

(56) References Cited

U.S. PATENT DOCUMENTS

| | | |
|---|---|---|
| 4,829,418 A | 5/1989 | Nielsen et al. |
| 5,848,485 A | 12/1998 | Anderson et al. |
| 6,253,160 B1 | 6/2001 | Hanseder |
| 6,263,595 B1 | 7/2001 | Ake |
| 2007/0150014 A1 | 6/2007 | Peterson et al. |
| 2015/0330060 A1 | 11/2015 | Seki et al. |
| 2016/0054114 A1 | 2/2016 | Crozier et al. |

OTHER PUBLICATIONS

Trimble GCS900 Grade Control System for Excavators, Version 12.60, Revision A, Part Number, Feb. 2014.

*Primary Examiner* — Anshul Sood
(74) *Attorney, Agent, or Firm* — Dinsmore & Shohl LLP

(57) ABSTRACT

A calibration framework comprises an excavator, a laser distance meter (LDM), and a plurality of laser reflectors. The excavator comprises a chassis, linkage assembly (LA), implement, and control architecture. The control architecture comprises a controller programmed to execute an iterative process at n linkage assembly positions to determine a position of an nth calibration node of the a plurality of nodes of the LA to determine triangular angles and side lengths of an external triangle formed between the nth calibration node and two other nodes having identified positions. The iterative process is repeated n times until triangular angles and side lengths of three external triangles are determined that form an internal triangle. Angles of the internal triangle are determined to generate an implement angle.

20 Claims, 4 Drawing Sheets

IMPLEMENT ANGLE DETERMINATION USING A LASER DISTANCE METER

CROSS-REFERENCE TO RELATED APPLICATIONS

The present application is a continuation of U.S. patent application Ser. No. 15/386,115, entitled "Excavator Implement Angle Determination using a Laser Distance Meter," and filed on Dec. 21, 2016, the entirety of which is incorporated by reference herein.

BACKGROUND

The present disclosure relates to excavators which, for the purposes of defining and describing the scope of the present application, comprise an excavator boom and an excavator stick subject to swing and curl, and an excavating implement that is subject to swing and curl control with the aid of the excavator boom and excavator stick, or other similar components for executing swing and curl movement. For example, and not by way of limitation, many types of excavators comprise a hydraulically or pneumatically or electrically controlled excavating implement that can be manipulated by controlling the swing and curl functions of an excavating linkage assembly of the excavator. Excavator technology is, for example, well represented by the disclosures of U.S. Pat. No. 8,689,471, which is assigned to Caterpillar Trimble Control Technologies LLC and discloses methodology for sensor-based automatic control of an excavator, US 2008/0047170, which is assigned to Caterpillar Trimble Control Technologies LLC and discloses an excavator 3D laser system and radio positioning guidance system configured to guide a cutting edge of an excavator bucket with high vertical accuracy, and US 2008/0000111, which is assigned to Caterpillar Trimble Control Technologies LLC and discloses methodology for an excavator control system to determine an orientation of an excavator sitting on a sloped site.

BRIEF SUMMARY

According to the subject matter of the present disclosure, a calibration framework comprises an earthmoving machine, a laser distance meter (LDM), and a plurality of laser reflectors. The earthmoving machine comprises a machine chassis, a linkage assembly, an earthmoving implement, and control architecture. The linkage assembly collectively defines a plurality of linkage assembly positions comprising a terminal pivot point B and a plurality of nodes. The LDM is configured to generate at least (i) an LDM distance signal $D_{LDM}$ indicative of a distance between the LDM and the laser reflector and (ii) an angle of inclination signal $\theta_{INC}$ indicative of an angle between the LDM and the laser reflector. The plurality of laser reflectors are disposed at respective positions corresponding to the plurality of nodes. The control architecture comprises one or more linkage assembly actuators and an architecture controller programmed to execute an iterative process at n linkage assembly positions. The iterative process comprises positioning the linkage assembly at a linkage assembly position n, setting one of the plurality of nodes as the nth calibration node with the linkage assembly at the linkage assembly position n, and determining a height $\hat{H}$ and a distance $\hat{D}$ between the nth calibration node and the LDM based on the LDM distance signal $D_{LDM}$ and angle of inclination signal $\theta_{INC}$. The iterative process further comprises determining a position of the nth calibration node at least partially based on the height $\hat{H}$ and the distance $\hat{D}$, and identifying respective positions of two other nodes that, together with the nth calibration node, form an external triangle. The two other nodes comprise one of the plurality of nodes and a node corresponding to a position of the terminal pivot point B. The iterative process further comprises determining side lengths for each of the legs of the external triangle formed between the nth calibration node and the two other nodes, and determining triangular angles of the external triangle based on the side lengths of the external triangle. The architecture controller is further programmed to repeat the iterative process n times until triangular angles and side lengths of at least three external triangles are determined. The external triangles form an internal triangle therebetween, the internal triangle shares two nodes and one side with each of the three external triangles and comprises a set of three internal triangle side lengths. The architecture controller is further programmed to determine the angles of the internal triangle at least partially based on the set of three internal triangle side length, generate an implement angle of the earthmoving implement at least partially based on a summation of a set of adjacent determined triangular angles, and operate the earthmoving machine using the implement angle. The set of adjacent determined triangular angles comprise an angle from the internal triangle and angles from at least two of the external triangles.

In accordance with one embodiment of the present disclosure, a calibration framework comprises an earthmoving machine, a laser distance meter (LDM), and a plurality of laser reflectors. The earthmoving machine comprises a machine chassis, a linkage assembly, an earthmoving implement, and control architecture. The linkage assembly collectively defines a plurality of linkage assembly positions comprising a terminal point and a plurality of nodes. The LDM is configured to generate at least (i) an LDM distance signal $D_{LDM}$ indicative of a distance between the LDM and the laser reflector and (ii) an angle of inclination signal $\theta_{INC}$ indicative of an angle between the LDM and the laser reflector. The plurality of laser reflectors are disposed at respective positions corresponding to a plurality of nodes. The control architecture comprises one or more linkage assembly actuators and an architecture controller programmed to execute an iterative process at n linkage assembly positions to determine a position of an nth calibration node of the plurality of nodes to determine triangular angles and side lengths of an external triangle formed between the nth calibration node and two other nodes having identified positions. The architecture controller is further programmed to repeat the iterative process n times until triangular angles and side lengths of at least three external triangles are determined. The external triangles form an internal triangle therebetween, the internal triangle shares two nodes and one side with each of the three external triangles and comprises a set of three internal triangle side lengths. The architecture controller is further programmed to determine the angles of the internal triangle at least partially based on the set of three internal triangle side lengths, generate an implement angle of the earthmoving implement at least partially based on a summation of a set of adjacent determined triangular angles, and operate the earthmoving machine using the implement angle. The set of adjacent determined triangular angles comprise an angle from the internal triangle and angles from at least two of the external triangles.

Although the concepts of the present disclosure are described herein with primary reference to the excavator illustrated in FIG. 1, it is contemplated that the concepts will enjoy applicability to any type of excavator, regardless of its particular mechanical configuration. For example, and not by way of limitation, the concepts may enjoy applicability to a backhoe loader including a backhoe linkage.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

The present disclosure relates to earthmoving machines and, more particularly, to earthmoving machines such as excavators including components subject to control. For example, and not by way of limitation, many types of excavators typically have a hydraulically controlled earthmoving implement that can be manipulated by a joystick or other means in an operator control station of the machine, and is also subject to partially or fully automated control. The user of the machine may control the lift, tilt, angle, and pitch of the implement. In addition, one or more of these variables may also be subject to partially or fully automated control based on information sensed or received by an adaptive environmental sensor of the machine. In the embodiments described herein, an excavator calibration framework utilizes a laser distance meter to determine an implement angle of an excavating implement of an excavator, as described in greater detail further below. Such determined values may be utilized by an excavator control to operate the excavator.

Figure 1:
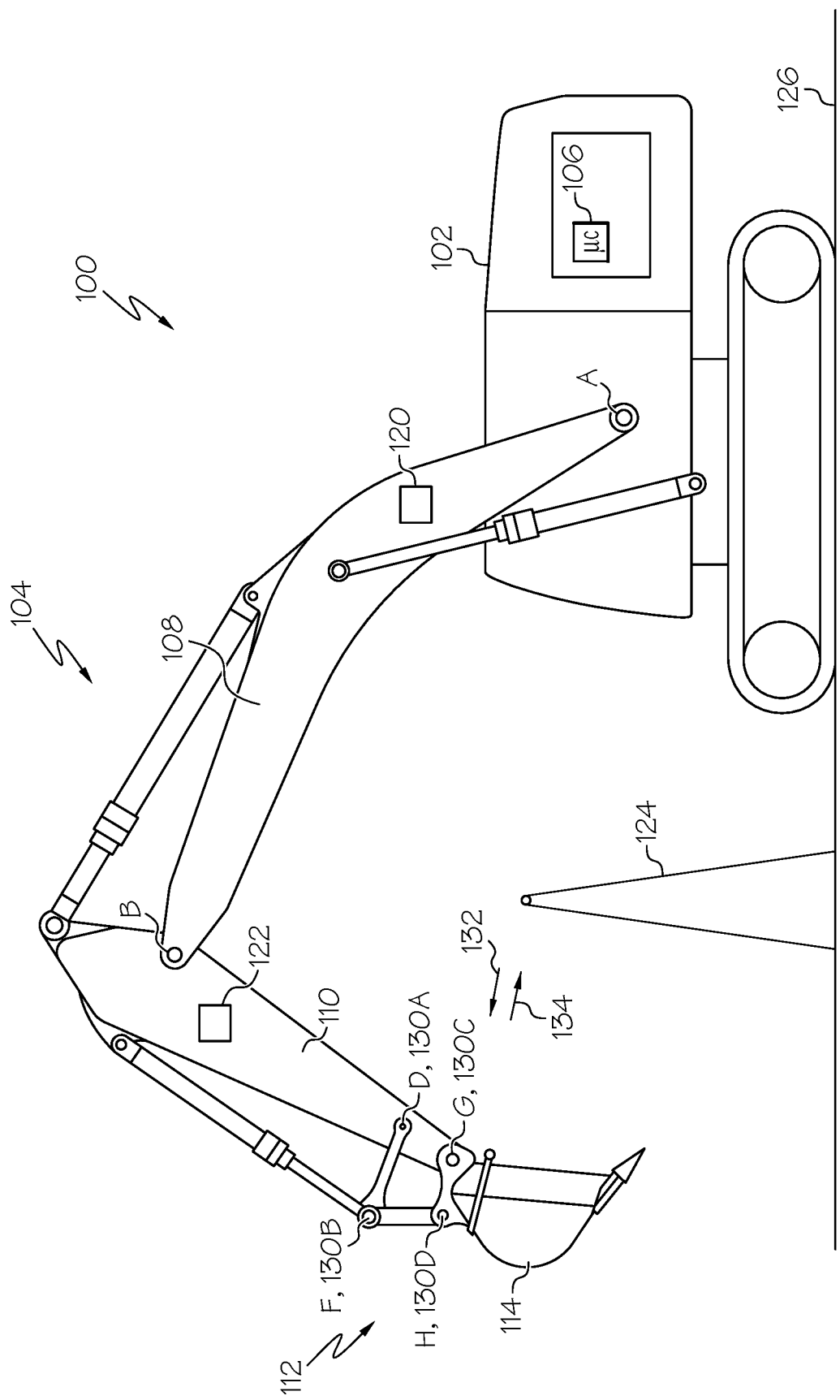
FIG. 1 is a side view of an excavator incorporating aspects of the present disclosure.

Referring initially to FIG. 1, excavator calibration framework comprises an excavator 100, a laser distance meter (LDM) 124, and a plurality of laser reflectors 130A, 130B, 130C, and 130D. The excavator comprises a machine chassis 102, an excavating linkage assembly 104, an excavating implement 114, and control architecture 106. The excavating linkage assembly 104 comprises an excavator boom 108, an excavator stick 110, the excavating implement 114, and a four-bar linkage 112 that collectively define a plurality of linkage assembly positions. The excavator stick 110 comprises a terminal point and is mechanically coupled to a terminal pivot point B of the excavator boom 108. The machine chassis 102 is mechanically coupled to a terminal pivot point A of the excavator boom 108. In embodiments, the excavating linkage assembly 104 is configured to swing with, or relative to, the machine chassis 102, and the excavator stick 110 is configured to curl relative to the excavator boom 108. Further, the excavating implement 114 and the excavator stick 110 are mechanically coupled to each other through the four-bar linkage 112.

The four-bar linkage 112 comprises a node D, a node F, a node G, a node H, and linkages disposed therebetween. In embodiments, the linkages comprise an implement linkage GH, a rear side linkage FH, a dogbone linkage DF, and a front side linkage GD. The implement linkage GH is disposed between respective positions corresponding to the node G and the node H. The rear side linkage FH is disposed between respective positions corresponding to the node F and the node H. The dogbone linkage DF is disposed between respective positions corresponding to the node D and the node F. The front side linkage GD is disposed between respective positions corresponding to the node D and the node G.

The node G of the four-bar linkage 112 is disposed at a position corresponding to the terminal point of the excavator stick 110 through which the excavator stick 110 is coupled to the excavating implement 114. The LDM 124 is configured to generate an LDM distance signal $D_{LDM}$ indicative of a distance between the LDM and the laser reflector (for example, one of 130A-130D) and an angle of inclination signal $\theta_{INC}$ indicative of an angle between the LDM and the laser reflector (for example, one of 130A-130D). The plurality of laser reflectors 130A, 130B, 130C, and 130D are disposed at respective positions corresponding to the nodes D, F, G, and H of the four-bar linkage 112. In embodiments, the laser reflector (for example, one of 130A-130D) is on a pole or secured directly to the corresponding nodes. The LDM 124 may be, for example, a Bosch GLM 100C LDM as made commercially available by Robert Bosch GmbH of Germany. A laser signal from the LDM 124, which is placed on ground 126, may be transmitted in a direction of an arrow 132 to the calibration node and an aligned laser reflector, and the laser signal may be reflected back to the LDM 124 in the direction of an arrow 134, as illustrated in FIG. 1.

The control architecture 106 comprises one or more linkage assembly actuators and an architecture controller programmed to execute an iterative process at n linkage assembly positions. In embodiments, the control architecture 106 comprises a non-transitory computer-readable storage medium comprising machine readable instructions. The one or more linkage assembly actuators may facilitate movement of the excavating linkage assembly 104. The one or more linkage assembly actuators may comprise a hydraulic cylinder actuator, a pneumatic cylinder actuator, an electrical actuator, a mechanical actuator, or combinations thereof.

Figure 5:
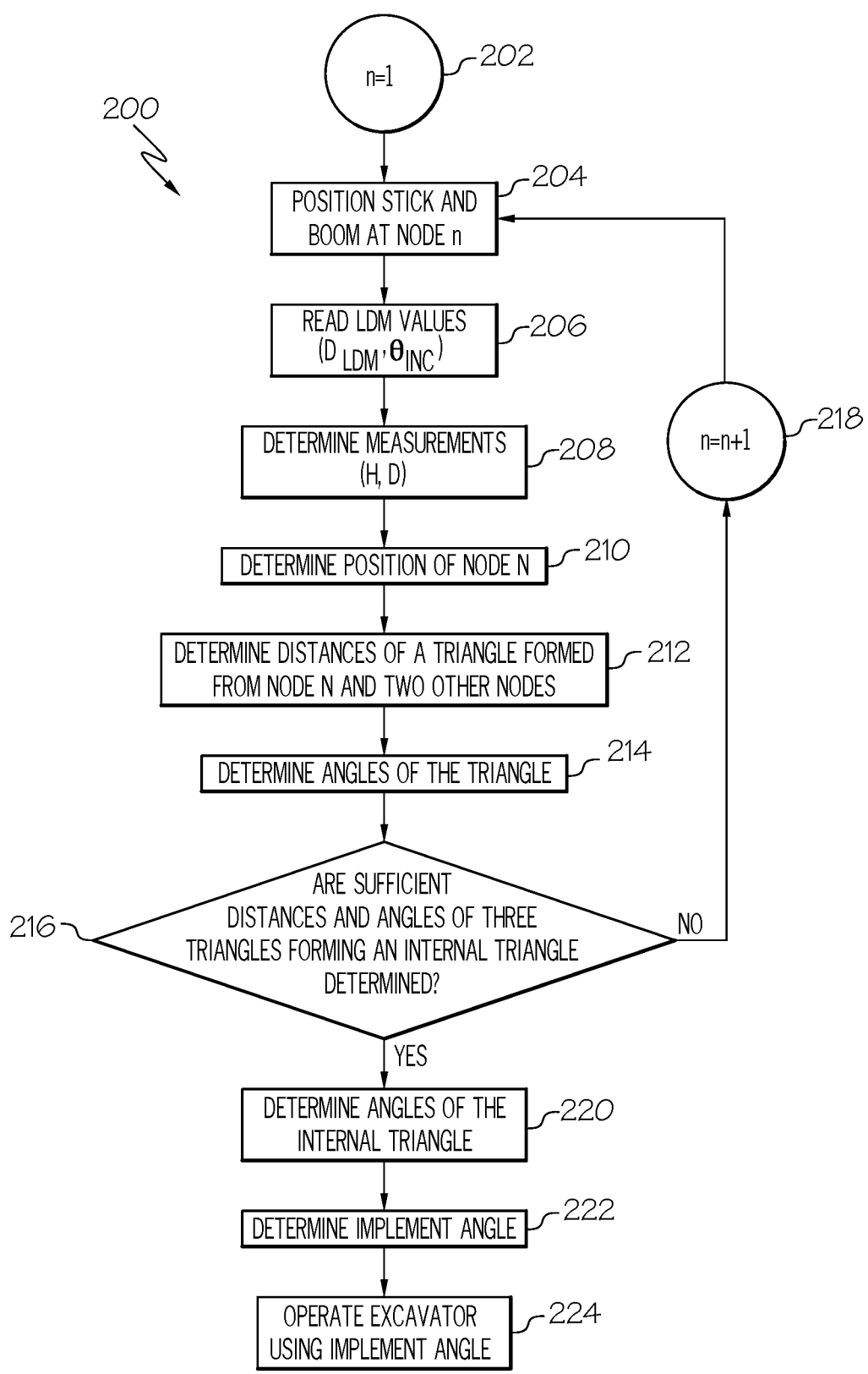
FIG. 5 is a flow chart of a process used to determine an implement angle of an excavating implement of the excavator of FIG. 1.

Steps 202-218 of a control scheme 200 of FIG. 5 illustrate the iterative process. In step 202, the iterative process starts with n=1 at a first linkage assembly position. In embodiments, for n=1, the 1st calibration node is positioned at the node D, for n=2, the 2nd calibration node is positioned at the node F, and for n=3, the 3rd calibration node is positioned at the node H.

Figure 3:
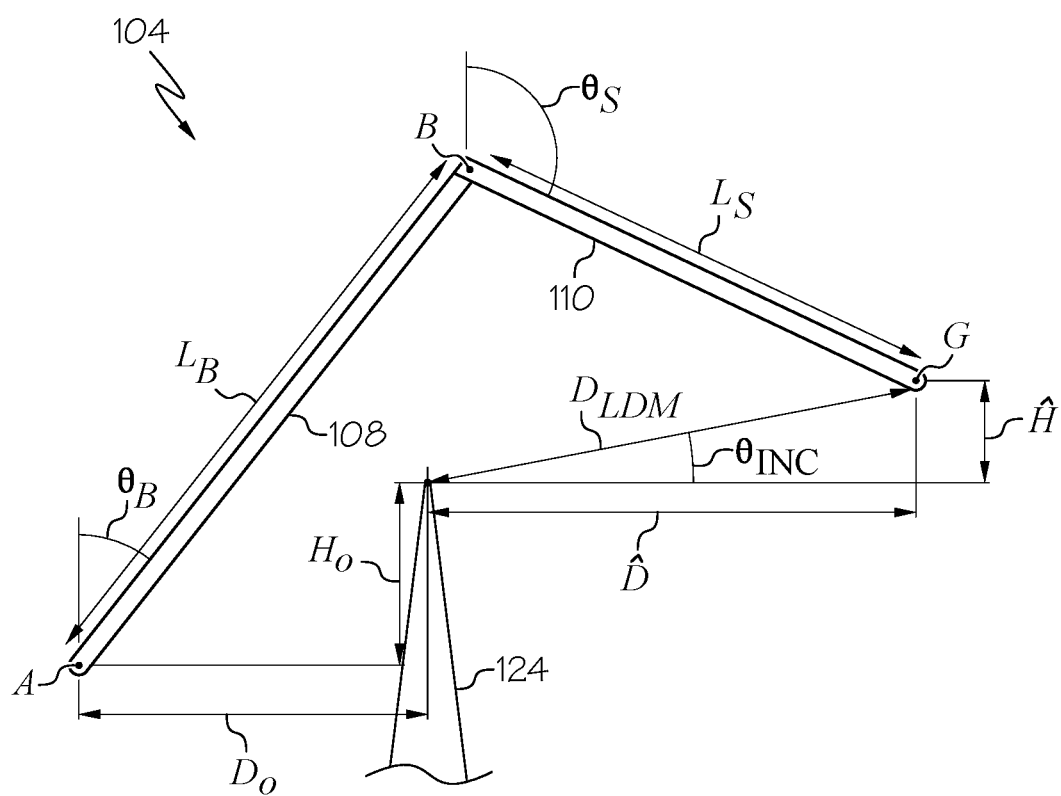
FIG. 3 is a side elevation view of a linkage assembly of an excavator calibration framework including a laser distance meter (LDM) of the excavator of FIG. 1.

In step 204, the iterative process comprises positioning the excavating linkage assembly 104 at a linkage assembly position n, setting one of the nodes D, F, G, and H as the nth calibration node with the excavating linkage assembly 104 at the linkage assembly position n. In steps 206-208, the iterative process comprises determining a height Ĥ and a distance D̂ between the nth calibration node and the LDM based on the LDM distance signal $D_{LDM}$ and angle of inclination signal $\theta_{INC}$. In step 210, the iterative process comprises determining a position of the nth calibration node at least partially based on the height Ĥ and the distance D̂. In embodiments of the iterative process, determining a position of the nth calibration node at least partially based on the height $\hat{H}$ and the distance $\hat{D}$ comprises calculating a total height $\check{H}$ and a total distance $\check{D}$ between the nth calibration node and the terminal pivot point A of the excavator boom 108. Referring to FIG. 3, the calculation is based on a summation of the height $\hat{H}$ and the distance $\hat{D}$ between the nth calibration node and the LDM 124 and the height $H_0$ and the distance $D_0$ between the LDM 124 and the terminal pivot point A. The height $\hat{H}$ and the distance $\hat{D}$ between the nth calibration node and the LDM 124 is determined per a following set of equations:

$$\hat{D}=D_{LDM}\cos(\theta_{INC}), \text{ and}$$

$$\hat{H}=D_{LDM}\sin(\theta_{INC}). \quad \text{(Equations 1-2)}$$

Figure 4:
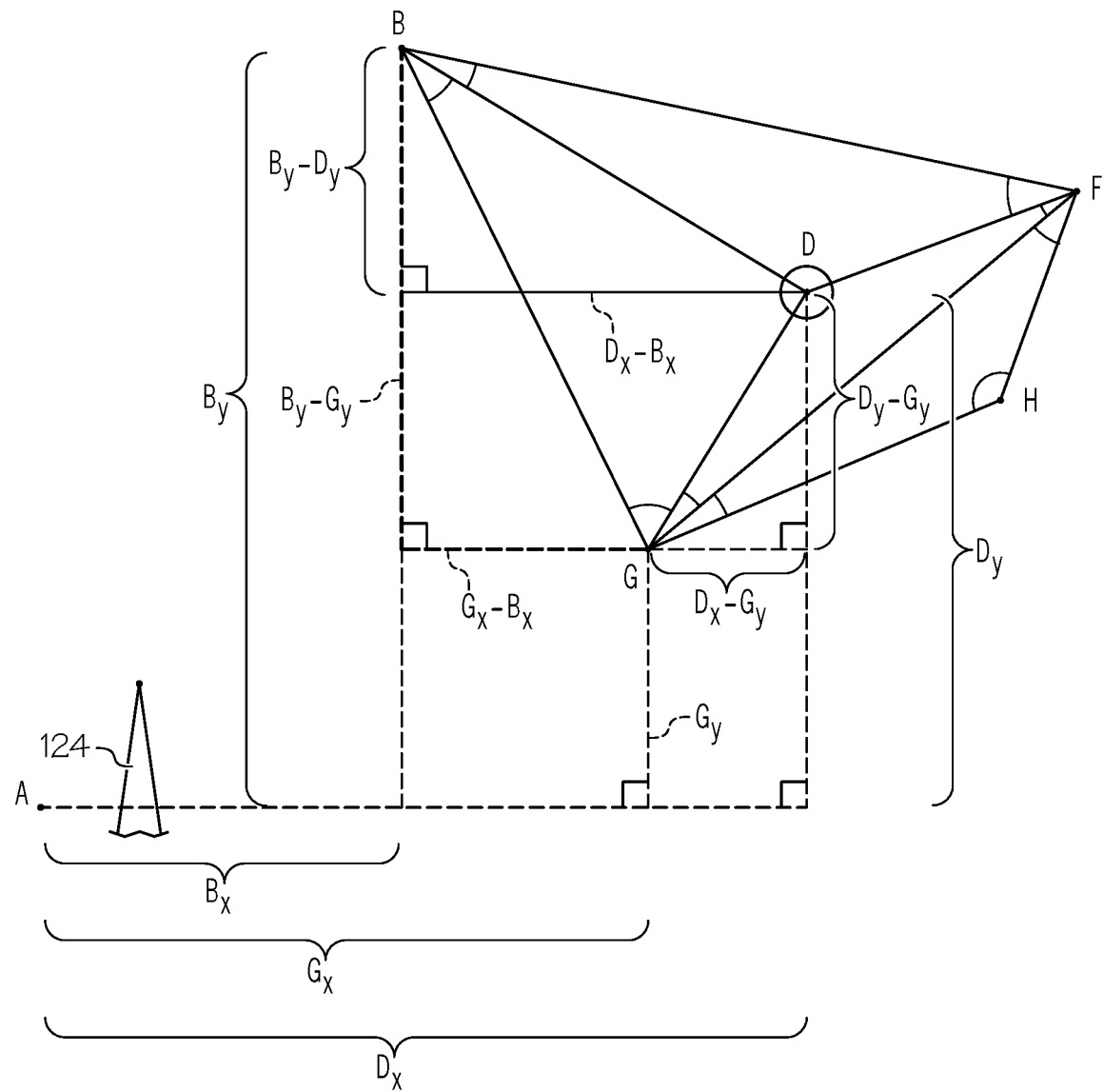
FIG. 4 is a side elevation view of a four-bar linkage assembly of the excavator of FIG. 1, according to various concepts of the present disclosure.

Further, referring to FIG. 4 and in an embodiment when n=1 and the 1st calibration node is positioned at the node D, calculating a total height $\check{H}$ and a total distance $\check{D}$ between the 1st calibration node and the terminal pivot point A of the excavator boom, respectively comprising $D_y$ and $D_x$, based on a summation of the height $\hat{H}$ and the distance $\hat{D}$ between the 1 st calibration node and the LDM and the height $H_0$ and the distance $D_0$ between the LDM and the terminal pivot point A comprises use of a following set of questions:

$$D_y=H_0+\hat{H}_D, \text{ and}$$

$$D_x=D_0+\hat{D}_D. \quad \text{(Equations 3-4)}$$

In an embodiment when n=2, the 2nd calibration node is positioned at pin F, such that calculating a total height $\check{H}$ and a total distance $\check{D}$ between the 2nd calibration node and the terminal pivot point A of the excavator boom, respectively comprising $F_y$ and $F_x$, based on a summation of the height $\hat{H}$ and the distance $\hat{D}$ between the 3rd calibration node and the LDM and the height $H_0$ and the distance $D_0$ between the LDM and the terminal pivot point A comprises use of a following set of equations:

$$F_y=H_0+\hat{H}_F, \text{ and}$$

$$F_x=D_0+\hat{D}_F. \quad \text{(Equations 5-6)}$$

In an embodiment when n=3, the 3rd calibration node is positioned at pin H, such that calculating a total height $\check{H}$ and a total distance $\check{D}$ between the 3rd calibration node and the terminal pivot point A of the excavator boom, respectively comprising $H_y$ and $H_x$, based on a summation of the height $\hat{H}$ and the distance $\hat{D}$ between the 3rd calibration node and the LDM and the height $H_0$ and the distance $D_0$ between the LDM and the terminal pivot point A comprises use of a following set of equations:

$$H_y=H_0+\hat{H}_H, \text{ and}$$

$$H_x=D_0+\hat{D}_H. \quad \text{(Equation 7-8)}$$

In embodiments, the architecture controller is further programmed to execute machine readable instructions to determine a total height $\check{H}$ and a total distance $\check{D}$ between the terminal point G and the terminal pivot point A based on a boom limb length $L_B$, a stick limb length $L_S$, a boom angle $\theta_B$, and a stick angle $\theta_S$. For example, and referring to FIG. 3, $L_S$ is a stick limb length of the excavator stick 110, $\theta_S$ is a stick angle of the excavator stick 110 relative to gravity, $L_B$ is a boom limb length of the excavator boom 108, and $\theta_B$ is a boom angle of the excavator boom 108 relative to gravity. Further, the architecture controller is programmed to determine a total height $\check{H}$ and a total distance $\check{D}$ between the terminal pivot point B and the terminal pivot point A based on a boom limb length $L_B$, and a boom angle $\theta_B$. The architecture controller is programmed to identify a height $H_0$ and a distance $D_0$ between the LDM and the terminal pivot point A.

The iterative process further comprises identifying respective positions of two other nodes that, together with the nth calibration node, form an external triangle. The two other nodes comprise one of nodes D, F, G, H, and a node corresponding to a position of the terminal pivot point B of the excavator boom 108. Further, in step 212, the iterative process comprises determining side lengths for each of the legs of the external triangle formed between the nth calibration node and two other nodes. In step 214, the iterative process comprises determining triangular angles of the external triangle based on the side lengths of the external triangle. In embodiments and referring to FIG. 4, the external triangles may comprise triangles BGD, BDF, and GFH.

For example, when n=1 and the 1st calibration node is positioned at the node D, the two other nodes comprise the terminal pivot point B and the node G, the legs of the external triangle comprise GD, BD, BG, and the triangular angles of the external triangle comprise angles BGD, GDB, DBG and are determined based on the side lengths determined for the legs GD, BD, and BG and the law of cosines.

Further, determining the side lengths for the legs BG, GD, and BD comprises calculating the side length for the leg BG based on the total height $\check{H}$ and the total distance $\check{D}$ between the node G and the terminal pivot point A, respectively comprising $G_y$ and $G_x$ and the total height $\check{H}$ and the total distance $\check{D}$ between the terminal pivot point B and the terminal pivot point A, respectively comprising $B_y$ and $B_x$. With respect to $G_y$ and $G_x$, a following set of equations may be used:

$$G_y=L_S\cos(\theta_S)+L_B\cos(\theta_B), \text{ and}$$

$$G_x=L_S\sin(\theta_S)+L_B\sin(\theta_B). \quad \text{(Equations 9-10)}$$

With respect to $B_y$ and $B_x$, a following set of equations may be used:

$$B_y=L_B\cos(\theta_B), \text{ and}$$

$$B_x=L_B\sin(\theta_B). \quad \text{(Equations 11-12)}$$

Thus, determining the side lengths for the legs BG, GD, and BD may include a following set of equations:

$$BG=\sqrt{(G_y-B_y)^2+(G_x-B_x)^2},$$

$$GD=\sqrt{(G_y-D_y)^2+(G_x-D_x)^2}, \text{ and}$$

$$BD=\sqrt{(D_y-B_y)^2+(D_x-B_x)^2} \quad \text{(Equations 13-15)}$$

The side length BG should be a length of the excavator stick and should be equivalent to $L_S$. In further embodiments, the excavator boom further comprises a variable-angle (VA) excavator boom, and for which $L_V$ is a limb length of the VA excavator boom, and $\theta_V$ is a VA boom angle of the VA excavator boom relative to gravity:

$$G_y=L_V\cos(\theta_V)+L_S\cos(\theta_S)+L_B\cos(\theta_B), \text{ and}$$

$$G_x=L_V\sin(\theta_V)+L_S\sin(\theta_S)+L_B\sin(\theta_B). \quad \text{(Equations 16-17)}$$

In such embodiments, with a VA excavator boom, the total height $\check{H}$ and the total distance $\check{D}$ between the terminal pivot point B and the terminal pivot point A, respectively comprising By and $B_x$, such that:

$$B_y=L_V\cos(\theta_V)+L_B\cos(\theta_B), \text{ and}$$

$$B_x=L_V\sin(\theta_V)+L_B\sin(\theta_B). \quad \text{(Equations 18-19)}$$

In embodiments, when n=2 and the 2nd calibration node is positioned at the node F, the two other nodes comprise the terminal pivot point B and the node D. Further, the legs of the external triangle comprise DF, BF, and BD, where $$DF=\sqrt{(D_y-F_y)^2+(D_x-F_x)^2}, \text{ and}$$

$$BF=\sqrt{(B_y-F_y)^2+(B_x-F_x)^2}. \quad \text{(Equations 20-21)}$$

Additionally, the triangular angles of the external triangle comprise angles BDF, DFB, FBD and are determined based on the side lengths determined for the legs DF, BF, and BD and the law of cosines. The angle BDF is representative of an actual dogbone angle BDF.

Figure 2:
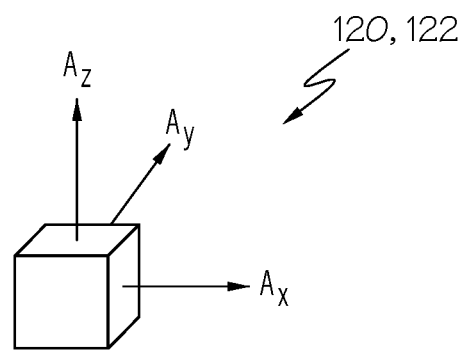
FIG. 2 is a perspective view of a dynamic sensor disposed on a linkage of the excavator of FIG. 1 and according to various concepts of the present disclosure.

In an embodiment, the excavator further comprises an implement dynamic sensor disposed on a dogbone linkage DF of the four-bar linkage 112. The architecture controller is further programmed to execute machine readable instructions to generate a dogbone measured angle $\theta_{DF}$ from the implement dynamic sensor. Further, the machine readable instructions may comprise instructions to compare the dogbone measured angle $\theta_{DF}$ to an actual dogbone angle BDF to determine a bias therebetween, and calibrate the implement dynamic sensor based on the bias. One or more dynamic sensors may include the implement sensor and dynamic sensors 120, 122 positioned on other excavator limbs such as the excavator boom 108 and the excavator stick 110, which are similar to the implement dynamic sensor. The one or more dynamic sensors may comprise an inertial measurement unit (IMU), an inclinometer, an accelerometer, a gyroscope, an angular rate sensor, a rotary position sensor, a position sensing cylinder, or combinations thereof. The IMU may comprise a 3-axis accelerometer and a 3-axis gyroscope. As shown in FIG. 2, the dynamic sensors 120, 122 include accelerations $A_x$, $A_y$, and $A_z$, respectively representing x-axis, y-axis-, and z-axis acceleration values.

In embodiments when n=3 and the 3rd calibration node is positioned at the node H, the two other nodes comprise the node F and the node G. Further, the legs of the external triangle comprise GH, FH, and FG, where $$GH=\sqrt{(G_y-H_y)^2+(G_x-H_x)^2},$$

$$FH=\sqrt{(F_y-H_y)^2+(F_x-H_x)^2}, \text{ and}$$

$$FG=\sqrt{(F_y-G_y)^2+(F_x-G_x)^2}. \quad \text{(Equations 22-23)}$$

Additionally, the triangular angles of the external triangle comprise angles FGH, GHF, HFG and are determined based on the side lengths determined for the legs GH, FH, and FG and the law of cosines.

The architecture controller is further programmed to repeat the iterative process n times until triangular angles and side lengths of at least three external triangles are determined. The external triangles form an internal triangle therebetween. Further, the internal triangle shares two nodes and one side with each of the three external triangles and comprises a set of three internal triangle side lengths. In an embodiment and referring to FIG. 4, the internal triangle comprises internal triangle GDF disposed between and internally of external triangles BGD, BDF, and GFH. The internal triangle GDF shares nodes G and D with the external triangle BGD, nodes DF with the external triangle BDF, and nodes F and G with the external triangle GFH.

As a non-limiting example, in step 216, the iterative process determines if sufficient distances and angles of three external triangles forming an internal triangle have been determined. If the answer is no, the iterative process proceeds to step 218 and repeat step 204 to position the excavating linkage assembly 104 at a next linkage assembly position n. If the answer is yes, the iterative process proceeds to step 220.

The architecture controller is further programmed to, as shown in step 220, determine the angles of the internal triangle at least partially based on the set of three internal triangle side lengths. As a non-limiting example, when, as described above, the 1st, 2nd, and 3rd calibration nodes have been respectively positioned at the nodes D, F, and H through the iterative process, in step 220, the set of internal triangle side lengths are length are legs DF, FG, and GD that form the internal triangle. Further, the angles of the internal triangle comprise angles DGF, GDF, and DFG and are determined based on the determined side lengths of the legs DF, FG, and GD and the law of cosines.

The architecture controller is further programmed to, as shown in step 222, generate an implement angle of the excavating implement at least partially based on a summation of a set of adjacent determined triangular angles. The set of adjacent determined triangular angles comprises an angle from the internal triangle and angles from at least two of the external triangles. In the example above, generating the implement angle comprises generate an angle BGH based on a summation of the determined angles DGF, BGD, and FGH. The architecture controller is further programmed to, as shown in step 224, operate the excavator using the implement angle.

It is contemplated that the embodiments of the present disclosure may assist to permit a speedy and more cost efficient method of determining implement dimensions such as an implement angle, and methods to determine and calibrate sensor offsets of sensors on excavator linkages, in a manner that minimizes a risk of human error with such value determinations. Further, the controller of the excavator or other control technologies are improved such that the processing systems are improved and optimized with respect to speed, efficiency, and output.

A signal may be "generated" by direct or indirect calculation or measurement, with or without the aid of a sensor.

For the purposes of describing and defining the present invention, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A calibration framework comprising an earthmoving machine, a laser distance meter (LDM), and a plurality of laser reflectors, wherein:
   the earthmoving machine comprises a machine chassis, a linkage assembly, an earthmoving implement, and control architecture;
   the linkage assembly collectively defines a plurality of linkage assembly positions comprising a terminal pivot point B and a plurality of nodes;
   the LDM is configured to generate at least (i) an LDM distance signal $D_{LDM}$ indicative of a distance between the LDM and a laser reflector of the plurality of laser reflectors and (ii) an angle of inclination signal $\theta_{INC}$ indicative of an angle between the LDM and the laser reflector;
   the plurality of laser reflectors are disposed at respective positions corresponding to the plurality of nodes;
   the control architecture comprises one or more linkage assembly actuators and an architecture controller programmed to execute an iterative process at n linkage assembly positions, the iterative process comprising:
   positioning the linkage assembly at a linkage assembly position n;
   setting one of the plurality of nodes as an nth calibration node with the linkage assembly at the linkage assembly position n,
   determining a height $\hat{H}$ and a distance $\hat{D}$ between the nth calibration node and the LDM based on the LDM distance signal $D_{LDM}$ and angle of inclination signal $\theta_{INC}$; and
   determining a position of the nth calibration node at least partially based on the height $\hat{H}$ and the distance $\hat{D}$;
   identifying respective positions of two other nodes that, together with the nth calibration node, form an external triangle, the two other nodes comprising one of the plurality of nodes, and a node corresponding to a position of the terminal pivot point B;
   determining side lengths for each of the legs of the external triangle formed between the nth calibration node and the two other nodes; and
   determining triangular angles of the external triangle based on the side lengths of the external triangle; and
   the architecture controller is further programmed to:
   repeat the iterative process n times until triangular angles and side lengths of at least three external triangles are determined, wherein the external triangles form an internal triangle therebetween, the internal triangle shares two nodes and one side with each of the three external triangles and comprises a set of three internal triangle side lengths;
   determine the angles of the internal triangle at least partially based on the set of three internal triangle side lengths;
   generate an implement angle of the earthmoving implement at least partially based on a summation of a set of adjacent determined triangular angles, the set of adjacent determined triangular angles comprising an angle from the internal triangle and angles from at least two of the external triangles; and
   operate the earthmoving machine using the implement angle.

2. The calibration framework as claimed in claim 1, wherein linkages of the linkage assembly comprise an implement linkage, a rear side linkage, a dogbone linkage, and a front side linkage.

3. The calibration framework as claimed in claim 1, wherein:
   the machine chassis is mechanically coupled to a terminal pivot point A; and
   in the iterative process, determining a position of the nth calibration node at least partially based on the height $\hat{H}$ and the distance $\hat{D}$ comprises:
   calculating a total height $\check{H}$ and a total distance $\check{D}$ between the nth calibration node and the terminal pivot point A based on a summation of the height $\hat{H}$ and the distance $\hat{D}$ between the nth calibration node and the LDM and a height $H_0$ and a distance $D_0$ between the LDM and the terminal pivot point A.

4. The calibration framework as claimed in claim 1, wherein the architecture controller is further programmed to execute machine readable instructions to
   determine a first total height $\check{H}$ and a first total distance $\check{D}$ between a terminal point G and a terminal pivot point A based on a boom limb length $L_B$, a stick limb length $L_S$, a boom angle $\theta_B$, and a stick angle $\theta_S$,
   determine a second total height $\check{H}$ and a second total distance $\check{D}$ between the terminal pivot point B and the terminal pivot point A based on a boom limb length $L_B$, and a boom angle $\theta_B$, and
   identify a height $H_0$ and a distance $D_0$ between the LDM and the terminal pivot point A.

5. The calibration framework as claimed in claim 1, wherein:
for n=1, the 1st calibration node is positioned at a node D;
for n=2, the 2nd calibration node is positioned at a node F; and
for n=3, the 3rd calibration node is positioned at a node H.

6. The calibration framework as claimed in claim 1, wherein:
the machine chassis is mechanically coupled to a terminal pivot point A; and
when n=1:
the 1st calibration node is positioned at a first node D of the plurality of nodes, such that calculating a total height $\check{H}$ and a total distance $\check{D}$ between the 1st calibration node and the terminal pivot point A of the excavator boom, respectively comprising $D_y$ and $D_x$, is based on a summation of the height $\check{H}$ and the distance $\check{D}$ between the 1st calibration node and the LDM and a height $H_0$ and a distance $D_0$ between the LDM and the terminal pivot point A;
the two other nodes comprise the terminal pivot point B and a second node G;
the legs of the external triangle comprise GD, BD, BG; and
the triangular angles of the external triangle comprise angles BGD, GDB, DBG and are determined based on the side lengths determined for the legs GD, BD, and BG and the law of cosines.

7. The calibration framework as claimed in claim 6, wherein determining the side lengths for the legs BG, GD, and BD comprises calculating the side length for the leg BG based on:
the total height $\check{H}$ and the total distance $\check{D}$ between the second node G and the terminal pivot point A, respectively comprising $G_y$ and $G_x$; and
the total height $\check{H}$ and the total distance $\check{D}$ between the terminal pivot point B and the terminal pivot point A, respectively comprising $B_y$ and $B_x$.

8. The calibration framework as claimed in claim 7, wherein when n=2:
the 2nd calibration node is positioned at a pin F, such that calculating a total height $\check{H}$ and a total distance $\check{D}$ between the 2nd calibration node and the terminal pivot point A of the excavator boom, respectively comprising $F_y$ and $F_x$, is based on a summation of the height $\check{H}$ and the distance $\check{D}$ between the 2nd calibration node and the LDM and the height $H_0$ and the distance $D_0$ between the LDM and the terminal pivot point A;
the two other nodes comprise the terminal pivot point B and the first node D;
the legs of the external triangle comprise DF, BF, and BD;
the triangular angles of the external triangle comprise angles BDF, DFB, FBD and are determined based on the side lengths determined for the legs DF, BF, and BD and the law of cosines; and
the angle BDF is representative of an actual dogbone angle BDF.

9. The calibration framework as claimed in claim 8, wherein when n=3:
the 3rd calibration node is positioned at a pin H, such that calculating a total height $\check{H}$ and a total distance $\check{D}$ between the 3rd calibration node and the terminal pivot point A, respectively comprising $H_y$ and $H_x$, based on a summation of the height $\check{H}$ and the distance $\check{D}$ between the 3rd calibration node and the LDM and the height $H_0$ and the distance $D_0$ between the LDM and the terminal pivot point A;
the two other nodes comprise the pin F and the second node G;
the legs of the external triangle comprise GH, FH, and FG; and
the triangular angles of the external triangle comprise angles FGH, GHF, HFG and are determined based on the side lengths determined for the legs GH, FH, and FG and the law of cosines.

10. The calibration framework as claimed in claim 9, wherein:
the set of internal triangle side lengths are length are legs DF, FG, and GD that form the internal triangle;
the angles of the internal triangle comprise angles DGF, GDF, and DFG and are determined based on the determined side lengths of the legs DF, FG, and GD and the law of cosines; and
generating the implement angle comprises generate an angle BGH based on a summation of the determined angles DGF, BGD, and FGH.

11. A calibration framework comprising an earthmoving machine, a laser distance meter (LDM), and a plurality of laser reflectors, wherein:
the earthmoving machine comprises a machine chassis, a linkage assembly, an earthmoving implement, and control architecture;
the linkage assembly collectively defines a plurality of linkage assembly positions comprising a terminal point and a plurality of nodes;
the LDM is configured to generate at least (i) an LDM distance signal $D_{LDM}$ indicative of a distance between the LDM and a laser reflector of the plurality of laser reflectors and (ii) an angle of inclination signal $\theta_{INC}$ indicative of an angle between the LDM and the laser reflector;
the plurality of laser reflectors are disposed at respective positions corresponding to the plurality of nodes;
the control architecture comprises one or more linkage assembly actuators and an architecture controller programmed to
execute an iterative process at n linkage assembly positions to determine a position of an nth calibration node of the plurality of nodes to determine triangular angles and side lengths of an external triangle formed between the nth calibration node and two other nodes having identified positions;
repeat the iterative process n times until triangular angles and side lengths of at least three external triangles are determined, wherein the external triangles form an internal triangle therebetween, the internal triangle shares two nodes and one side with each of the three external triangles and comprises a set of three internal triangle side lengths;
determine the angles of the internal triangle at least partially based on the set of three internal triangle side lengths;
generate an implement angle of the earthmoving implement at least partially based on a summation of a set of adjacent determined triangular angles, the set of adjacent determined triangular angles comprising an angle from the internal triangle and angles from at least two of the external triangles; and
operate the earthmoving machine using the implement angle.

12. The calibration framework as claimed in claim 11, wherein the earthmoving implement is mechanically coupled to the linkage assembly through the plurality of nodes.

13. The calibration framework as claimed in claim 11, wherein a first portion of the linkage assembly comprises a terminal point and is mechanically coupled to a terminal pivot point B.

14. The calibration framework as claimed in claim 11, wherein the plurality of nodes comprise a node D, a node F, a node G, a node H, and linkages disposed therebetween.

15. The calibration framework as claimed in claim 14, wherein the node G is disposed at a position corresponding to the terminal point of the a first portion of the linkage assembly through which the first portion of the linkage assembly is coupled to the earthmoving implement.

16. The calibration framework as claimed in claim 11, wherein the iterative process comprises:
    positioning the linkage assembly at a linkage assembly position n;
    setting one of a node D, F, G, and H as the nth calibration node with the linkage assembly at the linkage assembly position n,
    determining a height $\hat{H}$ and a distance $\hat{D}$ between the nth calibration node and the LDM based on the LDM distance signal $D_{LDM}$ and angle of inclination signal $\theta_{INC}$; and
    determining a position of the nth calibration node at least partially based on the height $\hat{H}$ and the distance $\hat{D}$;
    identifying respective positions of two other nodes that, together with the nth calibration node, form the external triangle, the two other nodes comprising one of nodes D, F, G, H, and a node corresponding to a position of a terminal pivot point B;
    determining side lengths for each of three legs of the external triangle formed between the nth calibration node and two other nodes; and
    determining triangular angles of the external triangle based on the side lengths of the external triangle.

17. The calibration framework as claimed in claim 16, wherein:
    for n=1, the 1st calibration node is positioned at the node D;
    for n=2, the 2nd calibration node is positioned at the node F; and
    for n=3, the 3rd calibration node is positioned at the node H.

18. The calibration framework as claimed in claim 11, wherein the control architecture comprises a non-transitory computer-readable storage medium comprising machine readable instructions.

19. The calibration framework as claimed in claim 11, wherein the one or more linkage assembly actuators facilitate movement of the linkage assembly.

20. The calibration framework as claimed in claim 19, wherein the one or more linkage assembly actuators comprise a hydraulic cylinder actuator, a pneumatic cylinder actuator, an electrical actuator, a mechanical actuator, or combinations thereof.

* * * * *